US010877682B2

(12) United States Patent
Veluswamy et al.

(10) Patent No.: US 10,877,682 B2
(45) Date of Patent: Dec. 29, 2020

(54) NON-DISRUPTIVE CROSS-PROTOCOL LIVE DATA MIGRATION

(71) Applicant: Western Digital Technologies, Inc., San Jose, CA (US)

(72) Inventors: Senthil Kumar Veluswamy, Bangalore (IN); Ayyanar Perumal, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/244,930

(22) Filed: Jan. 10, 2019

(65) Prior Publication Data
US 2020/0225863 A1 Jul. 16, 2020

(51) Int. Cl.
*G06F 3/06* (2006.01)
*G06F 12/02* (2006.01)

(52) U.S. Cl.
CPC ............ *G06F 3/0647* (2013.01); *G06F 3/061* (2013.01); *G06F 3/067* (2013.01); *G06F 3/0679* (2013.01); *G06F 12/0253* (2013.01)

(58) Field of Classification Search
None
See application file for complete search history.

(56) References Cited

U.S. PATENT DOCUMENTS

| 8,775,861 | B1 | 7/2014 | Raizen et al. |
| 9,063,896 | B1 | 6/2015 | Madnani et al. |
| 9,207,873 | B2 | 12/2015 | Nelson |
| 9,841,921 | B2 | 12/2017 | Colgrove et al. |
| 2012/0144110 | A1 | 6/2012 | Smith |
| 2014/0281306 | A1* | 9/2014 | Nakajima ............. G06F 3/0647 711/162 |
| 2015/0317177 | A1* | 11/2015 | Hussain ............. H04L 67/1097 718/1 |
| 2017/0177222 | A1* | 6/2017 | Singh ...................... G06F 3/061 |
| 2018/0095915 | A1* | 4/2018 | Prabhakar ............. G06F 13/385 |
| 2018/0189101 | A1* | 7/2018 | Xu ......................... G06F 9/5088 |

(Continued)

FOREIGN PATENT DOCUMENTS

CN 105488139 A 4/2016

OTHER PUBLICATIONS

Dell Inc., VMAX Non-Disruptive Migration (NDM) to All Flash, Dell EMC/World, 2017, 24 pages.
(Continued)

*Primary Examiner* — Michael Alsip
(74) *Attorney, Agent, or Firm* — John D. Henkhaus

(57) ABSTRACT

A non-disruptive cross-protocol live data migration process, such as from a legacy SAN storage network to a modern NVMe-oF storage network, includes maintaining a bitmap to track the transferred blocks at migration time, and utilizing the bitmap for intelligent I/O routing decisions that take into account characteristics of SSD-type NVM storage, such as endurance characteristics associated with solid state type memory. Furthermore, protocol command translations and multipath layer capabilities such as I/O queuing are advantaged at migration time to hide the underlying complexities related to a cross-protocol mass data migration, to enable a non-disruptive data migration process intended to avoid application downtime.

20 Claims, 7 Drawing Sheets

(56) References Cited

U.S. PATENT DOCUMENTS

2019/0356609 A1* 11/2019 Grunwald ........... G06F 11/2082

OTHER PUBLICATIONS

Dell Inc., SRDF—Remote Replication, Disaster Recovery—EMC, 2 pages, downloaded from SRDF—Remote Replication, Disaster Recovery—EMC, downloaded from https://www.emc.com/storage/symmetrix-vmax/srdf-40k.htm on Sep. 12, 2018.
Hewlett Packard Enterprise, Data migration strategies Migrating data to HPE 3PAR StoreServ, Feb. 2016, pp. 1-20, downloaded from https://h20195.www2.hpe.com/v2/GetPDF.aspx/4AA5-7179ENW.pdf.
Dell Inc., Data Migration to any Dell Storage Array V2.6, Apr. 2, 2013, pp. 1-14, downloaded from http://www.dell.com/downloads/global/services/data-migration-to-a-dell-storage-array.pdf.
Fujitsu Limited, White Paper Online Storage Migration for Minimizing Business Downtime, 2016-2017, pp. 1-36, downloaded from https://sp.ts.fujitsu.com/dmsp/Publications/public/dx_s3_OnlineStorageMigration_EN.pdf.

* cited by examiner

NON-DISRUPTIVE CROSS-PROTOCOL LIVE DATA MIGRATION

FIELD OF EMBODIMENTS

Embodiments of the invention may relate generally to data storage networks and, more particularly, to a non-disruptive cross-protocol live data migration process.

BACKGROUND

Storage networking involves the linking of multiple data storage devices, such as hard disk drives (HDDs) and/or non-volatile memory (NVM) storage devices (e.g., solid state devices, or "SSDs"), into a storage array or an array of storage arrays, and provides a centralized repository (e.g., a storage network) for digital data that is accessible to many users. Storage networks typically utilize high-speed connections and interconnections to provide fast performance, and are often employed as the backbone for datacenters (e.g., the backend storage for large-scale application/web service servers) and large-scale enterprise storage scenarios. For example, while not the only type of storage network, a common and well-known type of storage network is referred to as a SAN (storage area network), which provides block level data storage accessible to applications running on servers. In data center environments, a typical SAN includes multiple storage devices, controllers, and networking gear like routers, switches, bridges and gateways. Furthermore, each type of storage network relies on one or more communication/interface protocols. For example, SANs can use a variety of communication protocols, including Fibre Channel (FC), Internet Small Computer System Interface (iSCSI), Advanced Technology Attachment (ATA) over Ethernet (AoE), Fibre Channel over Ethernet (FCoE), Enterprise Systems Connection (ESCON) over Fibre Channel, Hyper-SCSI and others.

The trend with large-scale data storage scenarios seems to be moving away from spinning-disk storage device arrays such as HDD arrays to NVM storage device arrays. Thus, data storage customers may encounter the need to "upgrade" their storage networks from a common SAN to one of the newer types of storage networks that utilize all-NVM arrays and NVM-based communication protocols. In the context of such a storage network upgrade or migration, customers would need to complete a data migration process to transfer (i.e., "migrate") their data from their old storage network to their new storage network, which is a non-trivial endeavor.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a non-disruptive cross-protocol live data migration process are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Introduction

Recall that a storage network migration requires a data migration process to transfer all the data stored in the existing storage array to the new storage array. For example, data storage customers may need to migrate massive amounts of data from a SAN that employs a certain storage networking protocol to a NVM storage array that employs the NVMe-oF ("NVMe over fabric") storage networking protocol, and would likely desire and benefit from an efficient and seamless data migration process. That is, customers would likely want their data migration process to be non-disruptive, meaning that the applications that rely on access to the data being migrated would not experience any downtime or substantial delay in the performance of their I/O (input/output) operations. However, a common method for mass data migration involves using a large capacity external storage device to manually copy/move data from one data storage platform to another, which is considered a disruptive and inefficient solution due to the application downtime that it entails.

Method for Cross-Protocol Storage Network Data Migration

As NVMe SSD capacity steadily and continuously increases (such as Exabyte, Zettabyte of storage) without compromising on the I/O per second (IOPS) throughput in a significant manner, design of a suitable data migration solution should consider meeting the following design constraints:

(a) be largely non-disruptive to host applications;
(b) be avoid data integrity issues due to migration;
(c) be able to restore the optimal performance throughput after migration as quickly as feasible;
(d) be predictable at any given time during migration;
(e) no need for proprietary software;

(f) no need for much parameter tweaking to complete the migration;
(g) no need for any special hardware equipment to complete the migration;
(h) no software constrains (like particular device-driver version, particular firmware versions, etc.);
(i) easy to monitor;
(j) recoverable from a point-of-failure during migration;
(k) able to support any heterogeneous host/target environments;
(l) simple to configure on-the-fly (like how many Logical Units (or Logical Unit Numbers, LUNs) to move at a time, etc.); and
(m) simple to scale up and scale down as and when needed.

Figure 1:
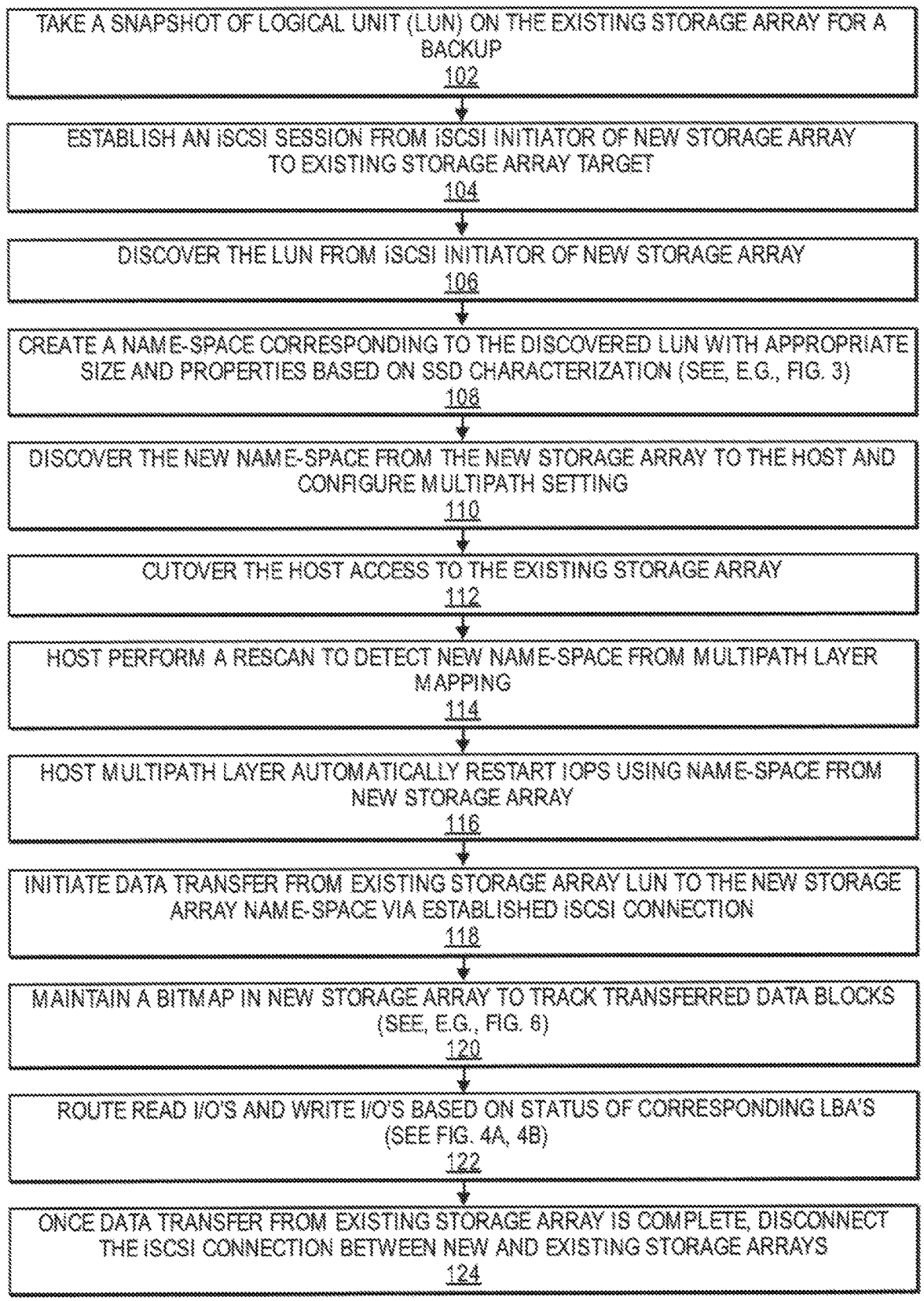
FIG. 1 is a flow diagram illustrating a method for non-disruptive cross-protocol live data migration, according to an embodiment.

FIG. 1 is a flow diagram illustrating a method for non-disruptive cross-protocol live data migration, according to an embodiment. Different blocks corresponding to the method of FIG. 1 may be initiated and/or performed by various actors, such as by an administrator and/or an automated or semi-automated operation or series of operations by an electronic component. FIGS. 2A-2E are schematic diagrams illustrating various states associated with the non-disruptive cross-protocol live data migration method of FIG. 1, according to an embodiment. According to an embodiment, the method of FIG. 1 is performed in the context of a cross-protocol data migration process, and at least some of the blocks may be described in that context. In a related embodiment, the method of FIG. 1 is performed in the context of migrating data from an existing SAN to a new NVMe storage array (for a non-limiting example, an all-flash NVM storage array), and at least some of the blocks may be described in that context.

The underlying software stack on which the new storage array is constructed may vary from implementation to implementation. For example, any software stack providing for storage connectivity such as Remote Direct Memory Access (RDMA) over Converged Ethernet (RoCEv1), RoCEv2, Internet Wide-area RDMA Protocol (iWARP), iSCSI or FC is considered compatible. Thus, the new storage array software stack does not necessarily significantly impact the data migration process described herein. However, according to one embodiment, the new storage array is based upon the Storage Performance Development Kit ("SPDK"), a set of tools and libraries for writing high performance, scalable, user-mode storage applications. The SPDK provides RoCEv1, RoCEv2, iWARP, and traditional iSCSI and FC based front-end transports to access the back-end Peripheral Component Interconnect Express (PCIe) NVMe SSD via fabric, e.g., NVMEoF and SAN based logical units, respectively. Hence, no additional software needs to be installed as the solution is completely built within the SPDK stack.

The data migration approach described herein is intended to preferably meet the foregoing design constraints so that the host will not be impacted with any data outage or downtime. Processing, functions, procedures, actions, method steps, and the like, that are described herein as being initiated, performed or performable by, for example, a computing device, a system controller, or by some other electronic component, may include enactment by execution of one or more sequences of instructions stored in one or more memory units and which, when executed by one or more processors, cause such performance. Electronic components referenced herein may be embodied in any form of and/or combination of hardware, software, and firmware. For example, a system controller or an IT management console/client may comprise an application-specific integrated circuit (ASIC) comprising at least one memory unit for storing such instructions (such as firmware, for a non-limiting example) and at least one processor for executing such instructions, thereby enabling, e.g., initiation, performance, and monitoring of various actions via execution of corresponding instructions.

Generally, a data storage network may be communicatively coupled with a host, which may be embodied in a hardware machine on which executable code is executable (for non-limiting examples, a computer or hardware server, and the like), or as software instructions executable by one or more processors (for non-limiting examples, a software server such as a database server, application server, media server, and the like). A host generally represents a client of the storage network, and has the capability to make read and write requests to the storage network. Note that a system controller or other electronic components may at times also be referred to as a "host" because the term is often generally used in reference to any device that makes I/O calls to a data storage device or an array of devices.

Now with reference to FIG. 1, at block 102, for backup purposes a snapshot of a logical unit ("LU", also sometimes referred to as "LUN" for logical unit number), or multiple LUNs, is taken on an existing storage array. A LUN is a unique identifier given to separate devices, or logical units, so that they can be accessed via a SAN-based protocol.

Figure 2A:
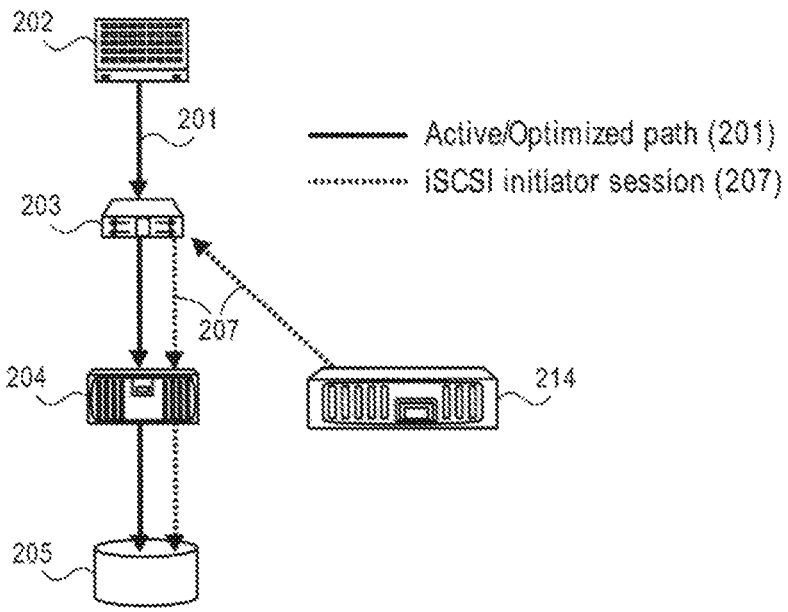
FIGS. 2A-2E are schematic diagrams illustrating various states associated with the non-disruptive cross-protocol live data migration method of FIG. 1, according to an embodiment.

At block 104 a transport session (e.g., storage network connectivity session) is established from initiator (for a non-limiting example, iSCSI, used herein to illustrate the data migration process) of the new storage array to the existing storage array target. A client in a storage network is called the initiator node (or simply, "initiator"), which can connect to a server (the "target"), or in this case respective storage array controllers, for example. In doing so, the initiator sends commands to the target. An initiator may be implemented in hardware and/or software/logic. Reference is now made to FIG. 2A for a schematic illustrating the status of the data migration process at this point, representing the active or optimized path 201 between the host 202 and the existing storage array 204 (e.g., a iSCSI target SAN controller) and corresponding LUN 205, via a switch 203. FIG. 2A further represents the iSCSI initiator session 207, established at block 104, between the new storage array 214 (e.g., a NVMe storage array controller) and the existing storage array 204 and the corresponding LUN 205, via the switch 203.

At block 106 the LUN 205 (FIG. 2A) is discovered via the iSCSI initiator of the new storage array 214 (FIG. 2A).

At block 108 a name-space is created, corresponding to the discovered LUN 205, having the appropriate size and properties based on SSD characterizations/characteristics, such as Disk-Writes-Per-Day (DWPD), PE (program-erase) count, wear level, and the like.

Figure 3:
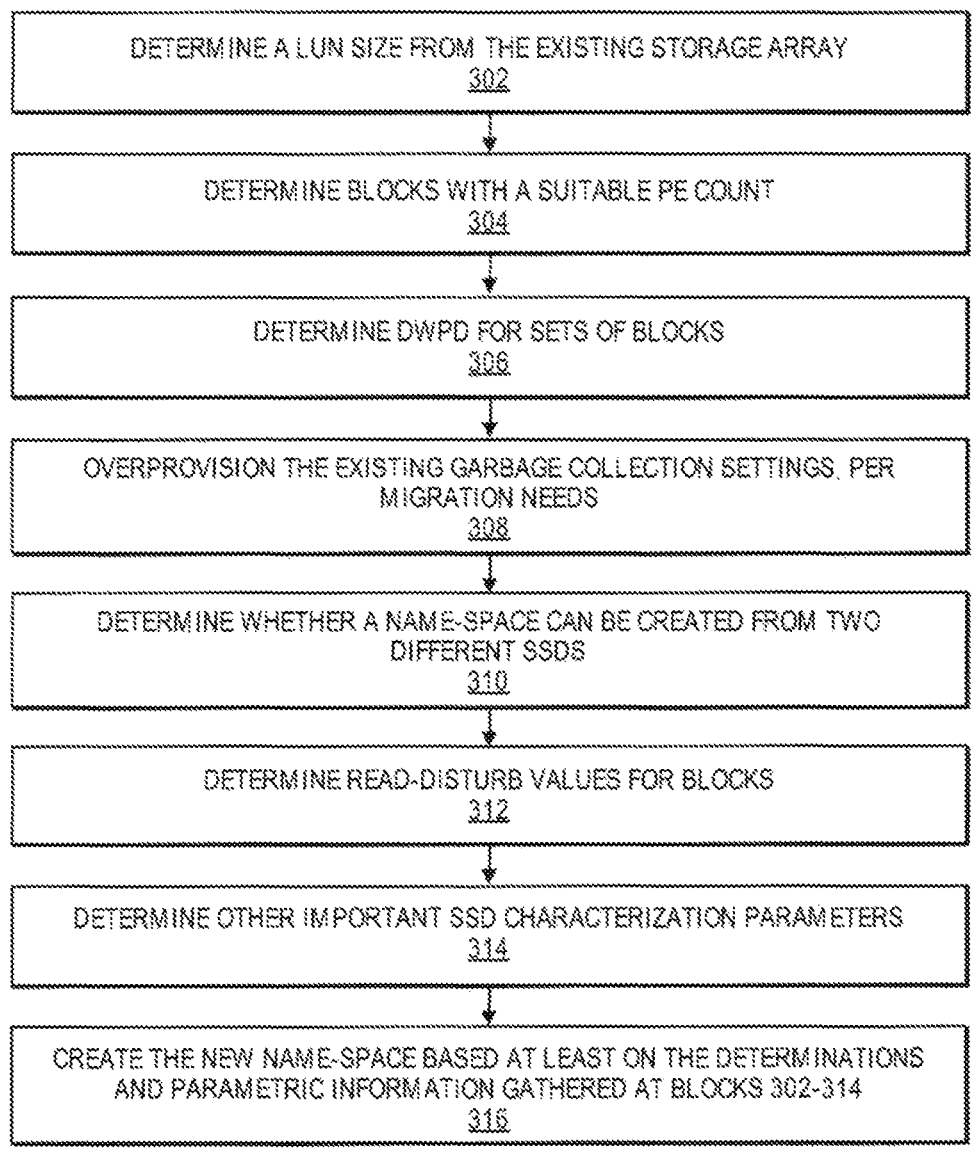
FIG. 3 is a flow diagram illustrating a method for intelligently creating a name-space, according to an embodiment.

FIG. 3 is a flow diagram illustrating a method for intelligently creating a name-space, according to an embodiment. At block 302, a LUN size is determined from the existing storage array. For example, the size of the LUN 205 is determined or identified, from the existing storage array 204.

At block 304, blocks with a suitable PE (program-erase) count are determined or identified, such as from the corresponding SSD controller firmware (e.g., the Flash Translation Layer, or "FTL" layer). Flash-blocks have a corresponding predefined PE count after manufacturing, and if a flash-block's current PE count is relatively high or close to its predefined PE count, then that means its end-of-life is near. Thus, the data from that flash-block should be moved to another flash-block before that flash-block becomes unusable. The goal of block 304 is to select a "best" set of flash-blocks to use for back-up I/O (i.e., migration I/O) to avoid rewriting of the same flash-blocks again and again (i.e., after copying from the old array to the new array) during back-up I/O progress due to PE count issues.

At block 306, the DWPD for sets of blocks are determined or identified, such as from the corresponding SSD controller firmware. Because backup (migration) I/O and host I/O are being processed in parallel, one should ensure that DWPD values are not violated, such as by algorithmically tuning the migration I/O and/or the host I/O during runtime to determine how much ratio of DWPD to be given to the host I/O versus the migration I/O.

At block 308, the existing garbage collection settings are overprovisioned, per migration needs, e.g., based on the LUN size, which is proportionate to the total data to be transferred. When a flash device is manufactured it is configured with "extra blocks" for garbage collection (GC) to work. If a GC initiates then that means there are not enough flash-blocks available for host I/Os, so a cleanup operation is required to free flash-blocks for host I/Os. During this cleanup operation the host I/O may be paused or slowed down, which is preferably avoided because it impacts application performance. Thus, overprovisioning the GC properly is beneficial in ensuring that the cleanup operation happens at a lower water-mark level than a higher water-mark level of "number of dirty blocks", where a lower water-mark level GC does not impact host I/Os much as it happens in a background mode without slowing down or pausing host I/Os. Because it is known that this data migration process will incur substantially more write I/Os than read I/Os, then it is beneficial to revisit the factory default GC values and to tune the GC settings to the needs of the migration process as a precautionary act so that the migration I/O operations will not as likely be disturbed or slowed down.

At block 310, it is determined whether a name-space can be created from two different SSDs, and the name-space creation is handled accordingly. Because the name-space can be created from multiple different flash devices that may have different/varying performance capabilities, and each of the corresponding software architectures (e.g., their FTL layer) is different, their PE count, DWPD, GC, READ-DISTURB, and many other parameters may be significantly different. Hence, because a name-space may be created from multiple different SSDs, handling the creation of such a "hybrid" name-space in view of their respective parameters should be handled algorithmically, in view of at least the foregoing parameters discussed in reference to blocks 304-308.

At block 312, READ-DISTURB values for blocks are determined and, at block 314, other important SSD characterization parameters are determined, such as bad-block regions, meta-data regions, and the like, such as from the corresponding SSD controller firmware. Hence, at block 316, the new name-space is created based at least on the determinations and parametric information gathered at blocks 302-314.

Figure 2B:
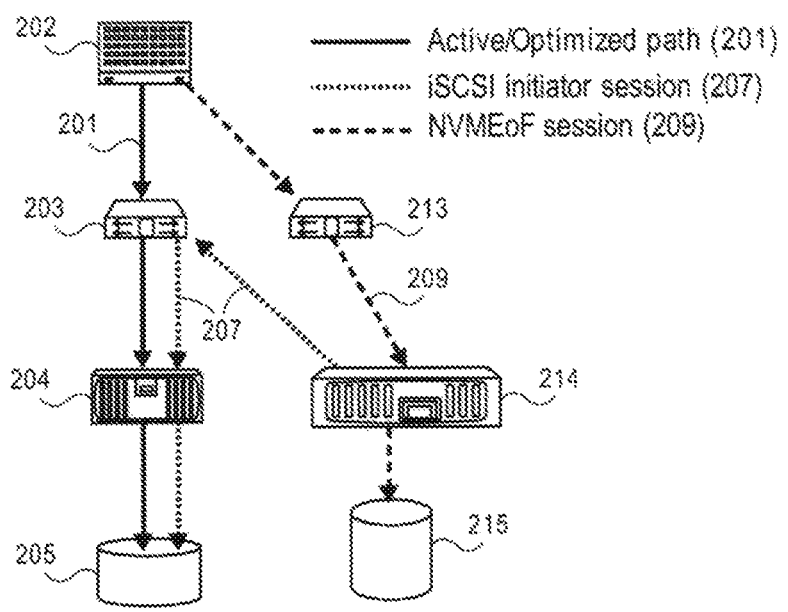

Returning to FIG. 1, at block 110 the new name-space from the new storage array is discovered by the host 202, and multipath settings are properly configured. For example and as illustrated in FIG. 2B, the new name-space 215 from the new storage array 214 is exposed to the host 202, and proper multipath layer policy settings (e.g., a NVMe-oF over RoCEv2 session) are configured.

For example, multipath layer effectively functions as a virtual wrapper device around the block layer and enables a virtual device like "/dev/mpath01" to an application that sits above it, whereby the application knows only about this virtual device alone to operate on. Thus, changes that may happen at the physical devices, like devices going online/ offline, are hidden from the application and handled appropriately at multipath layer itself so that the application using the virtual device will not need to handle any of these complexities. The application will not know any other details like what "/dev/mpath01" is constructed with, e.g., it could be constructed with "/dev/sda & /dev/sdb" or "/dev/ sdY & /dev/sdZ" but, regardless, the application will not know or need to be concerned with that. Now, assume that when a new name-space 215 is detected and mapped to the host 202 from the new storage array 214, it is detected as "/dev/sdm", and assume that the virtual device "/dev/ mpath01" is constructed with "/dev/sda & /dev/sdb" where "/dev/sda & /dev/sdb" are paths to the existing storage array (e.g., SAN). This migration process first adds "/dev/sdm" (i.e., new name-space path) to the virtual device "/dev/ mpath01", so that when "/dev/sda" or "/dev/sdb" gets removed (i.e., when disconnecting the existing storage), the host application will still have access to data via "/dev/sdm" path from the new storage array 214. This is one aspect of achieving non-disruptiveness, described in a simplified manner. A more detailed solution preferably includes multipath layer policy parameter settings like I/O queue depth, I/O queue policy, I/O polling timeout, etc. Beyond virtualization, the multipath settings can also be used to satisfy SSD characteristics requirements, such as if a maximum allowable DWPD limit is reached then I/O's could be queued and perhaps prioritized in multipath layer, and the like.

Figure 2C:
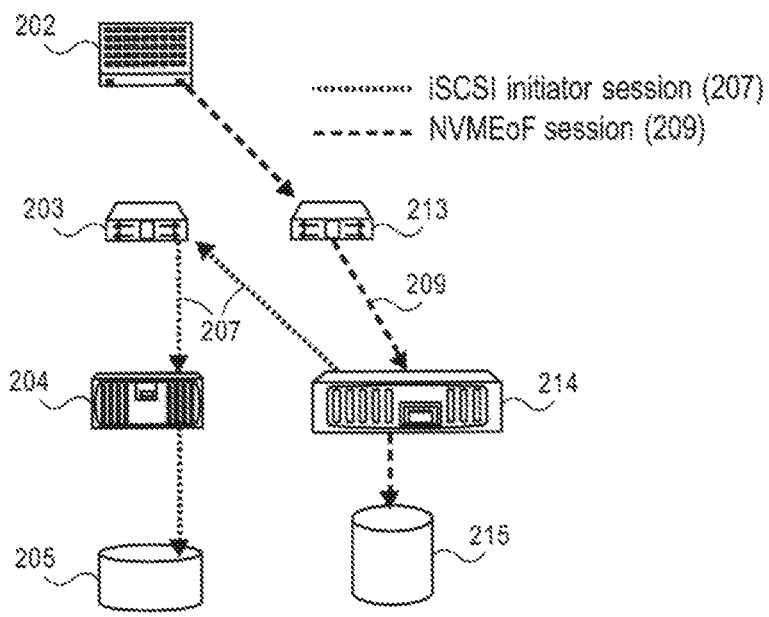
Figure 2D:
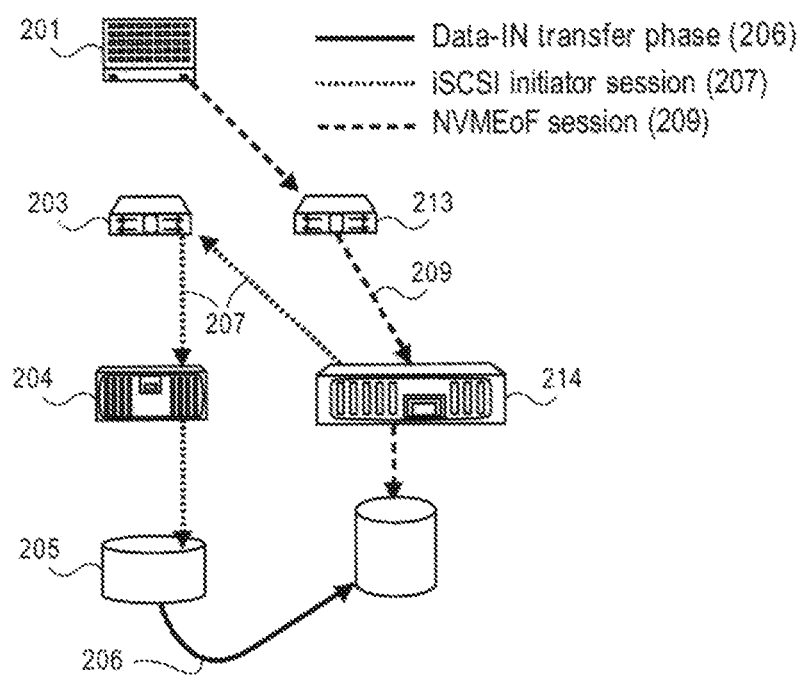

At block 112 the host access is cutover from the existing storage array to the new storage array. For example and as illustrated in FIG. 2C, the active or optimized path 201 between the host 202 and the existing storage array 204 and corresponding LUN 205, via a switch 203, is disconnected. However, once the host is cut off from the SAN, the SAN still operates as if it is communicating directly with the host 202 rather than with the new NVMe storage array 215 via the iSCSI initiator session 207 and, therefore, the NVMe storage array 215 needs to act like the host 202 and handle the host I/Os. This, too, contributes to the non-disruptiveness of this method.

Then, at block 114 the host 202 will perform a rescan to detect the new name-space 215 from (NVMe-oF session) multipath 209 layer mapping. Because multipath setting for name-space 215 from new storage array 214 is already preconfigured, down-time to the host 202 is avoided during this rescan process, and switching of LUN 205 to name-space 215 takes place here, without impacting host application IOPS. Regarding rescan, in general, any changes that happen at host transport layer (e.g., cutting host access via the active or optimized path 201) will trigger a host wide rescan at multipath layer. Thus, when the host 202 is cut-off from the existing storage array 204, the host bus adapter (HBA) driver/firmware would send an event to host multipath layer and as part of handling the event multipath layer will trigger a host wide rescan for all virtual devices. This rescan happens for all devices, even if they are discovered previously (i.e., at block 110), not just for the virtual devices that are constructed with name-spaces alone. During such event handling, all the application I/Os are by default queued at multipath layer (multipath layer also provides other policy setting to users/admins with which they can choose the behavior that they want) and once the event is handled, then multipath layer itself restarts the queued application I/O's. As long as a multipath layer is able to restart the queued I/Os before application timeout period then this is considered a non-disruptive method to host applications.

After this step, the traditional LUN (e.g., LUN 205) appears as the new name-space (e.g., name-space 215) to the host 202, and data migration happens without host knowledge. The host 202 and associated applications do not need to be aware of whether the data is in a traditional SAN storage network or a NVMe-oF storage network. This complexity is hidden from the host 202, at least in part by the multiple paths (e.g., SAN and NVMe-oF paths) enabled by the multipath layer, which contributes to the non-disruptive smooth data migration in the background without any application downtime.

Additionally, mapping or translating of SAN commands to NVMe commands, and vice versa, are handled in the background when necessary. While the SCSI stack is relatively aged and therefore somewhat limited with respect to more modern storage arrays, the NVMe stack is intentionally limited with respect to the number of I/O commands as its goal is more high-performance related. SAN handles SCSI command sets and NVMe-oF handles NVMe command sets. Thus, the order-ness and timeliness of processing SCSI commands are completely different from processing NVMe commands. This method handles these two different paradigms of command sets simultaneously during data migration, i.e., by processing SCSI commands against the existing storage array 204 (e.g., SAN array) and processing new I/Os from the host 202 against the new storage array (e.g., NVMe array), e.g., in view of the I/O routing procedures of FIGS. 4A-4B, and mapping commands among the different command sets when necessary, thereby providing a cross-protocol migration.

Additionally more, SCSI-based error handling exceptions are mapped or translated to corresponding NVMe-based error handling exceptions. Thus, during data migration, the host 202 can be notified of the NVMe-based error handling exception by the new (e.g., NVMe) storage array 214. Likewise, during data migration the new storage array 214 may receive an error handling exception from the host 202, and the new (e.g., NVMe) storage array 214 can notify the existing (e.g., SAN) storage array 204 about the error handling exception by way of a SCSI-based command or communication.

At block 116 the host multipath layer automatically restarts IOPS using the new storage array 214, and at block 118 data transfer is initiated from the existing storage array LUN to the new storage array name-space via the established iSCSI connection. For example and with reference to FIG. 2D, the data-in transfer 206 phase, from the existing storage array LUN 205 to the new storage array name-space 215, occurs by way of the existing iSCSI initiator session 207 (represented in a direct simplified form as data-in transfer 206). According to an embodiment, in order to throttle IOPS during data-in transfer 206 phase, the QoS of the new storage array software stack may be used to do IOPS rate limiting dynamically on the fly, and which can be integrated into management software as policies, for example. This provides additional control and flexibility to the data center administrator to accelerate or decelerate the phase of data migration on the fly based on their real-time data load or need without the need to stop the migration process.

At block 120 a bitmap is maintained in the new storage array 215 to track the transferred data blocks from the existing storage array 205 to the new storage array 215 via the data-in transfer 206. For a non-limiting example, one benefit of such tracking of the transferred data blocks is to provide a restart point in the case of a system or process crash. Furthermore, this bitmap may provide "intelligence" for prioritizing and routing I/Os during the data migration process, thus helping to avoid certain problems with NVM media (e.g., flash), such as write-amplification, wearing, DWPD, and other endurance-based characteristics, for example.

Figure 5:
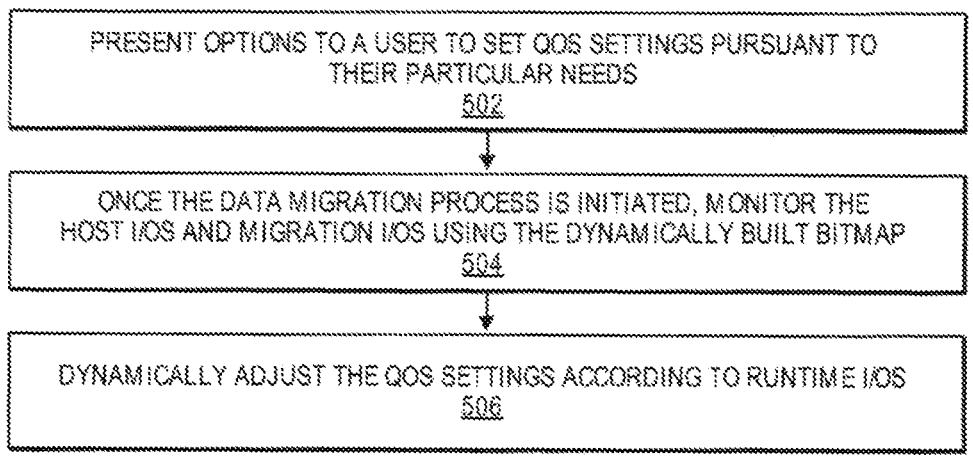
FIG. 5 is a flow diagram illustrating a dynamic QoS (Quality of Service) process, according to an embodiment.

FIG. 5 is a flow diagram illustrating a dynamic QoS (Quality of Service) process, according to an embodiment. At block 502, options are presented (e.g., via a Graphical User Interface (GUI), Command Line Interface (CLI), Representational State Transfer (REST) application programming interface (API), and the like) to a user/administrator to set QoS settings pursuant to their particular needs (just for examples, perhaps 50% host I/O and 50% migration I/O, or 80% host I/O and 20% migration I/O). Then, once the data migration/transfer process is initiated (e.g., at block 118 of FIG. 1), then at block 504 the host I/Os and migration I/Os are monitored using the dynamically built bitmap of block 120 (FIG. 1), and at block 506 the QoS settings are dynamically adjusted according to the runtime I/Os.

Figure 6:
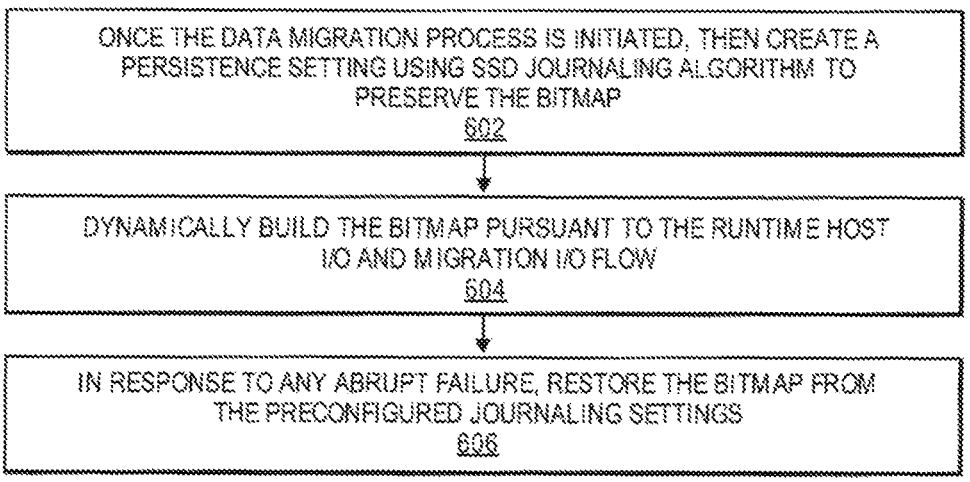
FIG. 6 is a flow diagram illustrating a bitmap persistence process, according to an embodiment.

FIG. 6 is a flow diagram illustrating a bitmap persistence process, according to an embodiment. Once the data migration/transfer process is initiated (e.g., at block 118 of FIG. 1), then at block 602 a persistence setting is created or set using SSD journaling algorithm to preserve the bitmap (created and maintained at block 120 of FIG. 1). There is typically a built-in set of algorithms in flash/SSD devices generally referred to as "journaling", which is for protecting critical data across all kinds of failures and restoring such data to a last consistency point during a recovery procedure. Typically, these journaling algorithms are used primarily to protect a few parameters critical for the device to operate. Here, the same journaling framework may be used to protect the bitmap, such as by duplicating the bitmap, maintaining consistency among duplicate bitmap copies, rebuilding the bitmap, and the like. Thus, at block 604 (and block 120) the bitmap is being dynamically built pursuant to the runtime host I/O and migration I/O flow and, at block 606, in the event of or in response to any abrupt failure (e.g., a power failure or user-induced failure such as pausing the migration) the bitmap is restored from the preconfigured journaling settings that were set at block 602.

Furthermore, the design of suitable algorithm/logic to execute against the bitmap may preferably consider the following constraints: (i) keeping track of all the SSD blocks' life cycles so that data is retained and not lost soon after copying from the existing storage array, which is considered a data-availability constraint; (ii) addressing DWPD requirements of a SSD to avoid write amplification issue; (iii) controlling garbage collection intelligently to avoid re-writes/repeated-writes on the same block; and (iv) other usage characteristics of SSDs, generally, noting that a hybrid storage array may include SSDs of varying characteristics and performance levels. Stated generally, in other words, a bitmap intelligence algorithm could embody the "where", "which", and "how much" SSD data migration occurs. According to an embodiment, the data structure of the bitmap includes such SSD characteristic/characterization fields that are populated accordingly during migration, whereby the algorithm dynamically can change or can take appropriate action based on these runtime field values.

Figure 4A:
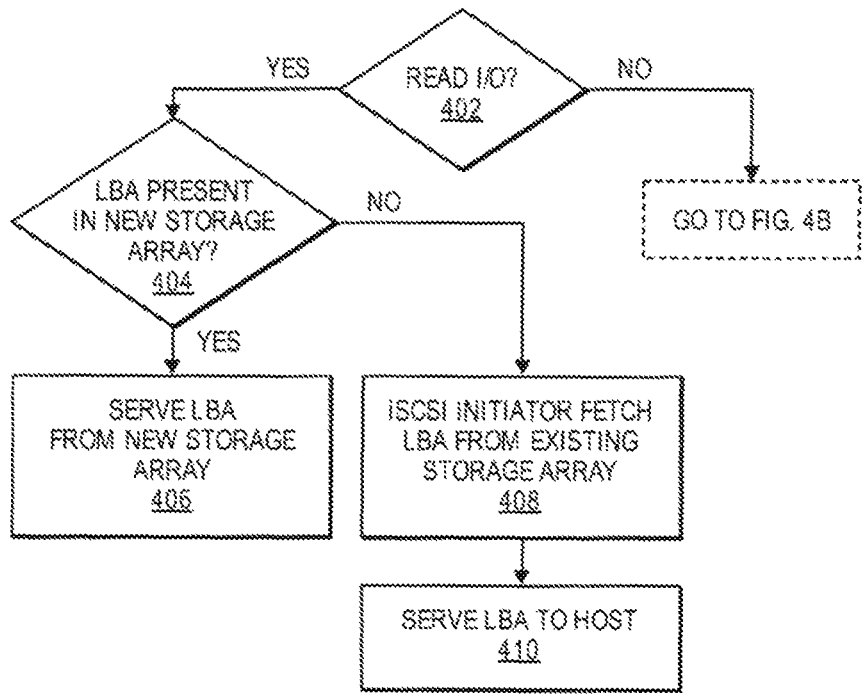
FIG. 4A is a flow diagram illustrating a method for handling Read I/O's during a live data migration procedure, according to an embodiment.
Figure 4B:
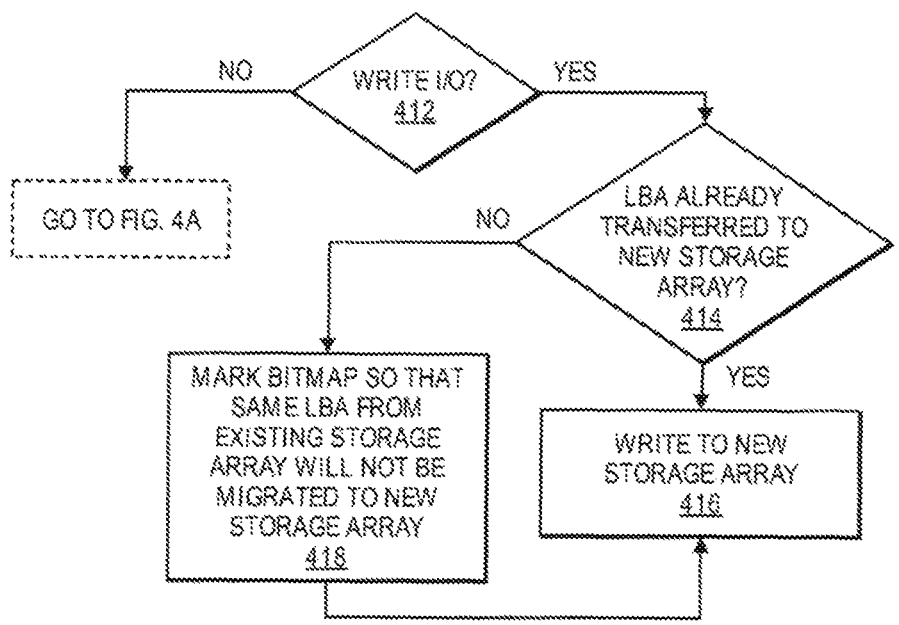
FIG. 4B is a flow diagram illustrating a method for handling Write I/O's during a live data migration procedure, according to an embodiment.

At block 122 read I/Os and write I/Os are routed based on or according to the status of the corresponding LBAs (logical block address) as represented in the bitmap, according to logic that is described in more detail in reference to FIGS. 4A, 4B.

Figure 2E:
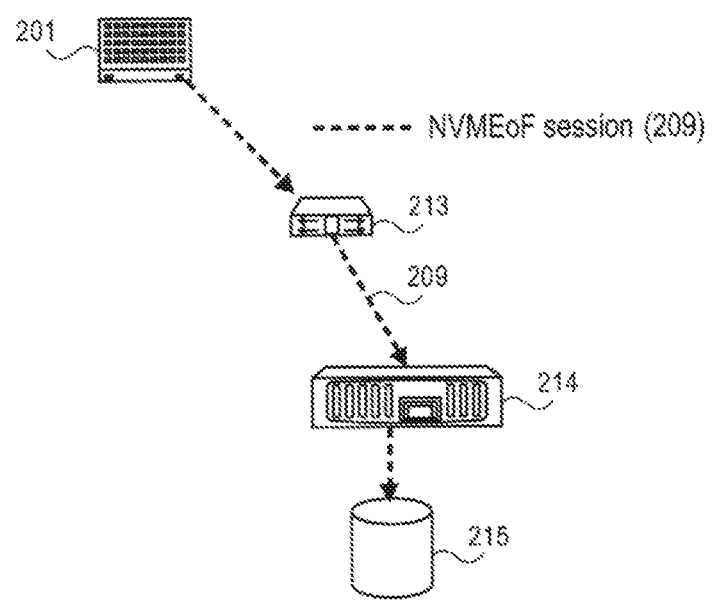

Finally, at block 124, once data transfer from the existing storage array 205 is complete, the iSCSI connection between the new storage array 215 and the existing storage array 205 is disconnected, as illustrated in FIG. 2E, and now all I/Os from the host 202 are routed directly to the new storage array via multipath 209 (e.g., a NVMe-oF session).

The method of FIG. 1 can be extended from traditional OEM array migration to any cloud-platform, e.g., it is possible to move data between an on-premise cloud to any public or off-premise cloud platforms using the foregoing method. Furthermore, the method is not dependent on any particular hardware platform and is able to support any heterogeneous host/target environment for data migration.

Routing I/Os During Live Data Migration

FIG. 4A is a flow diagram illustrating a method for handling read I/O's during a live data migration procedure and FIG. 4B is a flow diagram illustrating a method for handling write I/O's during a live data migration procedure, both according to embodiments.

With reference back to block 122 of FIG. 1, which is occurring during the live data transfer between the existing storage array 205 (FIG. 2D) and the new storage array 215 (FIG. 2D), and with reference to FIG. 4A, at block 402 it is determined whether an incoming I/O is a read I/O. If it is not a read I/O, then execution moves to FIG. 4B.

If the incoming I/O is a read I/O, then at block 404 it is determined, from the data block transfer bitmap maintained at block 120 (FIG. 1), whether the pertinent LBA(s) is present in the new storage array 215. Responsive to the pertinent LBA(s) being present in the new storage array 215, at block 406 the read request is served from the new storage array 215. Responsive to the pertinent LBA(s) not being present in the new storage array 215, at block 408 the iSCSI initiator fetches the LBA(s) from the existing storage array 205, and at block 410 the LBA(s) is served to the host.

Continuing, with reference again to block 122 of FIG. 1, which is occurring during the live data transfer between the existing storage array 205 (FIG. 2D) and the new storage array 215 (FIG. 2D), and with reference to FIG. 4B, at block 412 it is determined whether an incoming I/O is a write I/O. If it is not a write I/O, then execution moves to FIG. 4A.

If the incoming I/O is a write I/O, then at block 414 it is determined, from the data block transfer bitmap maintained at block 120 (FIG. 1), whether the pertinent LBA(s) is already transferred to the new storage array 215. Responsive to the pertinent LBA(s) being already present in the new storage array 215, at block 416 the write request is written to the new storage array 215. Responsive to the pertinent LBA(s) not being present in the new storage array 215, at block 418 the bitmap is marked so that same LBA(s) from the existing storage array 205 will not be migrated to the new storage array 215, and then at block 416 the write request is written to the new storage array 215.

An NVMe storage array would be typically primarily architectured for NVMe-based SSD devices. Furthermore, SSD characteristics are rather unique relative to other types of data storage devices such as HDDs, examples including DWPD (drive writes per day, an endurance rating), GC (garbage collection), life-cycle, etc. One of the more important characteristics or limitations of an SSD is that a lot of WRITE I/Os will bring down the life of an SSD. Moreover, NVMe-SSDs are very unique in terms of higher IOPS and low latency compared to other types of SSDs (e.g., Serial Attached SCSI (SAS)/Serial ATA (SATA) and HDDs. Thus, during large-scale data migration (e.g., petabytes or zet- abytes of data), known legacy data migration solutions are not considered very helpful because most of them are designed for SAN-to-SAN array migrations which do not consider these unique characteristics of NVMe SSDs. Therefore, the concepts underlying the foregoing method for write I/O processing during live data migration take in to consideration unique characteristics of SSDs, particularly by limiting detrimental effects (e.g., excessive, unnecessary writes) a mass data migration process might otherwise have on SSD and NVMe SSD arrays.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for data migration from an existing Storage Area Network (SAN) storage network to a Non-Volatile Memory Express over fabric (NVMe-oF) storage network, the method comprising:
    establishing a storage initiator session from a Non-Volatile Memory Express (NVMe) storage array to a SAN storage array;
    discovering, from the initiator session, a logical unit (LU) on the SAN storage array;
    creating a name-space, on the NVMe storage array, corresponding to the discovered LU;
    exposing the name-space to a host;
    configuring a multipath layer from the host to the NVMe storage array;
    disconnecting the host access to the SAN storage array, whereby application inputs/outputs (I/Os) are queued at the multipath layer;
    restarting the queued I/Os, now to the NVMe storage array; and
    initiating, via the initiator session, data transfer from the SAN storage array LU to the NVMe storage array name-space.

2. The method of claim 1, further comprising:
    maintaining a bitmap in the NVMe storage array to track transferred data blocks; and
    routing read I/Os and write I/Os based on a status of corresponding Logical Block Addresses (LBAs).

3. The method of claim 2, wherein routing write I/Os comprises:
receiving from the host a write request corresponding to a particular LBA;
determining from the bitmap whether the particular LBA is already transferred to the NVMe storage array;
responsive to the particular LBA being already transferred to the NVMe storage array, writing the particular LBA to the NVMe storage array; and
responsive to the particular LBA not being already transferred to the NVMe storage array:
updating the bitmap so that the particular LBA will not be transferred from the SAN storage array to the NVMe storage array; and
writing the particular LBA to the NVMe storage array.

4. The method of claim 2, wherein routing read I/Os comprises:
receiving from the host a read request corresponding to a particular LBA;
determining from the bitmap whether the particular LBA is present in the NVMe storage array;
responsive to the particular LBA being present in the NVMe storage array, serving the particular LBA to the host from the NVMe storage array; and
responsive to the particular LBA not being present in the NVMe storage array:
fetching the particular LBA from the SAN storage array via the initiator session; and
serving the particular LBA to the host.

5. The method of claim 1, wherein restarting the queued I/Os to the NVMe storage array is performed prior to an end of a Small Computer System Interface (SCSI) timeout period.

6. The method of claim 1, further comprising:
after disconnecting the host access to the SAN storage array, handling host I/Os at the NVMe storage array.

7. The method of claim 1, further comprising:
translating a Small Computer System Interface (SCSI)-based command to a NVMe-based command for submission to the NVMe storage array.

8. The method of claim 1, further comprising:
translating a Small Computer System Interface (SCSI)-based error handling exception to a NVMe-based error handling exception; and
during data transfer, notifying the host of the NVMe-based error handling exception.

9. The method of claim 1, further comprising:
during data transfer, the NVMe storage array receiving from the host an error handling exception; and
the NVMe storage array notifying the SAN storage array of the error handling exception via a Small Computer System Interface (SCSI)-based command.

10. The method of claim 1, further comprising:
during data transfer, and in response to an external command, limiting inputs/outputs per second (IOPS) from the host.

11. The method of claim 1, wherein creating the name-space comprises:
creating the name-space based on at least one parameter from a group of parameters, corresponding to flash-blocks of the NVMe storage array, consisting of program-erase count, disk-writes-per-day, and READ-DISTURB count.

12. The method of claim 11, wherein creating the name-space further comprises:
determining whether the name-space spans multiple solid-state memory devices, of the NVMe storage array, having one or more different corresponding parameters from the group of parameters; and
creating the name-space from the multiple solid-state memory devices based on the one or more different corresponding parameters.

13. The method of claim 11, further comprising:
overprovisioning the quantity of flash-blocks available for garbage collection.

14. A method for live data migration between a Storage Area Network (SAN)-based storage network and a Non-Volatile Memory Express (NVMe)-based storage network, the method comprising:
maintaining a bitmap in an NVMe storage array to track data blocks transferred from a SAN storage array, including:
tracking in a field in the bitmap, during the live data migration, Drive Writes Per Day (DWPD) associated with the NVMe storage array, and
determining, based on the bitmap field and during the live data migration, how many migration-based write inputs/outputs (I/Os) and how many host-based write I/Os to process; and
routing read I/Os and write I/Os based on a status of corresponding Logical Block Addresses (LBAs).

15. The method of claim 14, wherein routing read I/Os comprises:
receiving a read request corresponding to a particular LBA;
determining from the bitmap whether the particular LBA is present in the NVMe storage array;
responsive to the particular LBA being present in the NVMe storage array, servicing the read request from the NVMe storage array; and
responsive to the particular LBA not being present in the NVMe storage array:
fetching the particular LBA from the SAN storage array via an Internet Small Computer System Interface (iSCSI) initiator session; and
serving the particular LBA in response to the read request.

16. The method of claim 14, further comprising:
based on the bitmap, controlling garbage collection to avoid re-writes and repeated-writes on a same flash-block.

17. The method of claim 14, further comprising:
creating in a journaling function a persistence setting corresponding to the bitmap; and
in response to a data transfer failure, restoring the bitmap using the journaling function.

18. A system of storage array networks comprising:
means for establishing a storage initiator session from a Non-Volatile Memory Express (NVMe) storage array to a SAN storage array;
means for discovering, from the initiator session, a logical unit (LU) on the SAN storage array;
means for creating a name-space, on the NVMe storage array, corresponding to the discovered LU;
means for exposing the name-space to a host;
means for configuring a multipath layer from the host to the NVMe storage array;
means for disconnecting the host access to the SAN storage array, whereby application inputs/outputs (I/Os) are queued at the multipath layer;
means for restarting the queued I/Os, now to the NVMe storage array; and means for initiating, via the initiator session, data transfer from the SAN storage array LU to the NVMe storage array name-space.

19. The method of claim 2, wherein maintaining a bitmap comprises:
   tracking in a field in the bitmap, during the data migration, Drive Writes Per Day (DWPD) associated with the NVMe storage array; and
   determining, based on the bitmap field and during the data migration, how many migration-based write I/Os and how many host-based write I/Os to process.

20. The method of claim 14, wherein routing write I/Os comprises:
   receiving a write request corresponding to a particular LBA;
   determining from the bitmap whether the particular LBA is already transferred to the NVMe storage array;
   responsive to the particular LBA being already transferred to the NVMe storage array, writing the particular LBA to the NVMe storage array; and
   responsive to the particular LBA not being already transferred to the NVMe storage array:
      updating the bitmap so that the particular LBA will not be transferred from the SAN storage array to the NVMe storage array; and
      writing the particular LBA to the NVMe storage array.

* * * * *